United States Patent [19]

Luthier

[11] Patent Number: 5,473,215
[45] Date of Patent: Dec. 5, 1995

[54] POSITION DETECTOR OF THE ROTOR OF A PIEZO-ELECTRIC MOTOR

[75] Inventor: Roland Luthier, St-Sulpice, Switzerland

[73] Assignee: Asulab S.A., Bienne, Switzerland

[21] Appl. No.: 301,607

[22] Filed: Sep. 7, 1994

[30] Foreign Application Priority Data

Sep. 8, 1993 [CH] Switzerland .......................... 02688/93

[51] Int. Cl.[6] .................................................... H02N 2/00
[52] U.S. Cl. .................................................... 310/323
[58] Field of Search .................................. 310/323, 328, 310/316

[56] References Cited

U.S. PATENT DOCUMENTS

| | | | |
|---|---|---|---|
| 4,400,641 | 8/1983 | Vishnevsky et al. | 310/323 |
| 4,794,294 | 12/1988 | Shimizu et al. | 310/316 |
| 4,937,307 | 6/1990 | Saito et al. | 128/662.06 |
| 5,061,882 | 10/1991 | Takagi | 310/316 |
| 5,093,606 | 3/1992 | Adachi et al. | 310/316 |
| 5,214,339 | 5/1993 | Naito | 310/323 |
| 5,233,257 | 8/1993 | Luthier et al. | 310/323 |
| 5,336,958 | 8/1994 | Saya et al. | 310/323 |
| 5,357,489 | 10/1994 | Luthier | 310/323 |

FOREIGN PATENT DOCUMENTS

| | | | |
|---|---|---|---|
| 0424140 | 4/1991 | European Pat. Off. | G04C 3/12 |
| 0580049 | 1/1994 | European Pat. Off. | H01L 41/09 |
| 4131948 | 4/1992 | Germany | B06B 1/06 |
| 60-113675 | 1/1985 | Japan | H02N 2/00 |
| 60-51478 | 3/1985 | Japan | H02N 2/00 |

*Primary Examiner*—Thomas M. Dougherty
*Attorney, Agent, or Firm*—Griffin, Butler, Whisenhunt & Kurtossy

[57] ABSTRACT

A piezo-electric motor of the stationary wave tape comprises a stator including piezo-electric excitation means capable of inducing a vibratory motion in the stator, a rotor mounted for rotation relative to the stator, the rotor including a body on which are assembled flexion tabs forming transmission means arranged to transmit the vibratory motion of the stator to the rotor and to rotationally drive such rotor, said flexion tabs following a displacement path relative to the stator, and an angular position detector of the rotor. The motor is characterised in that the detector is arranged near and in line with the displacement path, and in that said detector is formed by one or several piezo-electric sensors allowing to track the passage of the tabs. The motor is particularly suitable for timepieces.

6 Claims, 6 Drawing Sheets

POSITION DETECTOR OF THE ROTOR OF A PIEZO-ELECTRIC MOTOR

FIELD OF THE INVENTION

The present invention concerns a piezo-electric motor in particular a stationary waves piezo-electric motor which is provided with a vibrating stator adapted to rotate a rotor having tabs (flexion legs) ending up on the stator, and which comprises a position detector capable of providing information about the angular position of the rotor.

More specifically, the invention concerns a peizo-electric motor as mentioned above being of small dimension and suitable for use in a timepiece.

BACKGROUND OF THE INVENTION

Known piezo-electric motors include on the one hand, a stator on which are mounted piezo-electric means, such as a polarised ceramic provided with excitation electrodes adapted to be electrically energised, and on the other hand, a rotor which rests axially on the stator and which is assembled for rotation relative to the latter around a driving shaft mechanically coupled to a mechanism to be driven.

Under the effect of the electrical excitation received from the electrodes, the ceramic transmits a vibratory motion to the stator which induces the rotational displacement of the rotor arranged to bear elastically thereon.

In this type of asynchronous motor, the angular position of the rotor is, after rotation, intrinsically unknown, which is a major inconvenience if the rotor is to drive the hands or the date-disc of a timepiece.

In patent application JP-A-60 113 765, a piezo-electric motor for a timepiece is disclosed comprising an angular position detector of the rotor. The motor comprises in a known manner a stator on which are mounted piezo-electric elements provided with electrical excitation electrodes, and a rotor assembled rotationally relative to the stator and provided with one or several holes. Above the holes formed in the rotor is assembled a Light Emitting Diode (LED) which is secured to a separate substrate which is fixedly attached to the motor. A photo-transistor is placed on a substrate positioned under the rotor, at right angles and in line with the LED. When the light emitted by the LED passes through the holes of the rotor, the photo-transistor will receive this emitted light and thus the angular position of the rotor can then be detected.

The size of the motor provided with this detector is large. Furthermore, the motor comprises a large number of parts which increase its price and decrease its reliability.

Another solution for detecting the position of the rotor is known from document JP-A-60 51 478 which proposes means for detecting the position of the rotor comprising an electrical contact system formed by a fixed brush, which rubs over a mobile disc on which 60 conducting contact-points are formed (collector). This detection disc, which is under tension, is fixed to the rotor. This arrangement also presents the inconvenience of having a large number of components. Moreover, the assembly of the motor is rather complicated because the detection disc must be centred onto the rotor and put under tension, and this for every single motor. Also, the contact between the brush and the contact-points causes a friction opposed to the rotary movement of the rotor so that the brush tends to wear out rapidly.

Furthermore, the wear of the contact-surface is difficult to master and the presence of dirt-particles caused by this wear can prevent normal functioning of the motor.

The aim of the present invention is to find a remedy for these inconveniences by providing a piezo-electric motor comprising a position detector being of very small dimension, which may be easily manufactured and which is of low cost.

SUMMARY OF THE INVENTION

An object of the present invention is to provide a piezo-electric motor of the type comprising a stator including piezo-electric excitation means capable of inducing a vibratory motion in the stator, a rotor mounted for rotation relative to the stator, said rotor including a body on which are assembled flexion tabs forming transmission means arranged to transmit the vibratory motion of the stator to the rotor and to rotationally drive such rotor, these flexion tabs following a displacement path relative to the stator, and an angular position detector of the rotor, said motor being characterised in that the detector is arranged near and in line with said displacement path, and in that the detector is formed by one or several piezo-electric sensors allowing to track the passage of said tabs.

Thus, it may be understood that by using the reversed piezo-electric effect the angular position of the rotor can be detected, and this thanks to the presence of one or several piezo-electric position sensors.

The present invention further concerns a manufacturing process of a stator, in particular for such a piezo-electric motor in which a disc of a machinable material such as for example silicon is provided, several piezo-electric and electrically conducting layers are deposited on this disc by sets of appropriate masks, and said layers are machined so as to obtain a piezo-electric excitation zone, this process being characterised by the fact that during the machining-step at least one peizo-electric detection zone is formed simultaneously to the piezo-electric excitation zone, to form an angular position detector of the rotor.

Other characteristics and advantages of the invention will appear more clearly upon reading of the following detailed description and referring to the attached drawings which show, by way of example, embodiments of the invention.

Referring to the attached drawings, there will be described hereinafter in a general manner a piezo-electric motor according to the invention and indicated by the general reference M.

The motor M includes a stator 1, the vibrating part V of which is formed, for example, in a plate of micro-machined silicon.

The motor M further includes a rotor 4 which is mounted for rotation relative to stator 1 around a geometrical rotation axis X.

Stator 1 includes a cavity or "tub" 6 arranged in the thickness of stator 1 and intended to form a housing in the interior of which is arranged the rotor 4. Cavity 6 which exhibits a circular form, is sunk directly in the body of stator 1 by a volume micro-machining technique practised more specifically by a chemical attack on the silicon over a given time period. Such a silicon machining technique being well known, it will not be described here in a more detailed manner.

Figure 1:
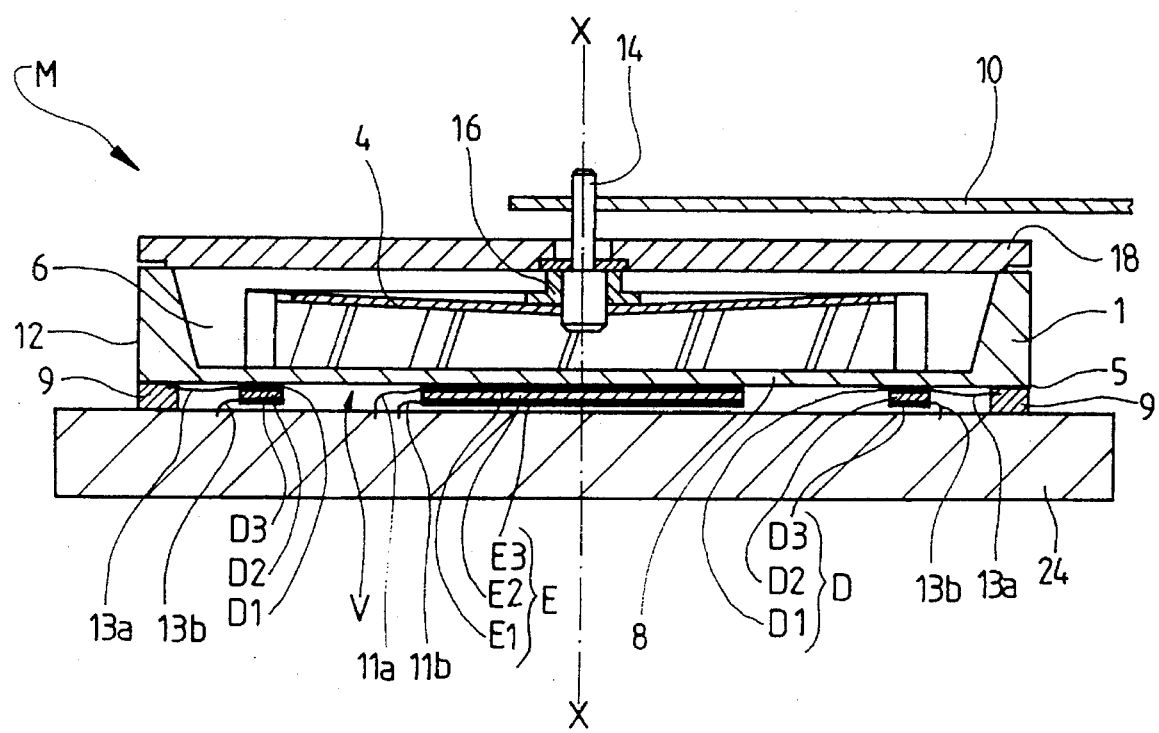
FIG. 1 is a schematic cross-section view of the motor according to the invention.
Figure 2:
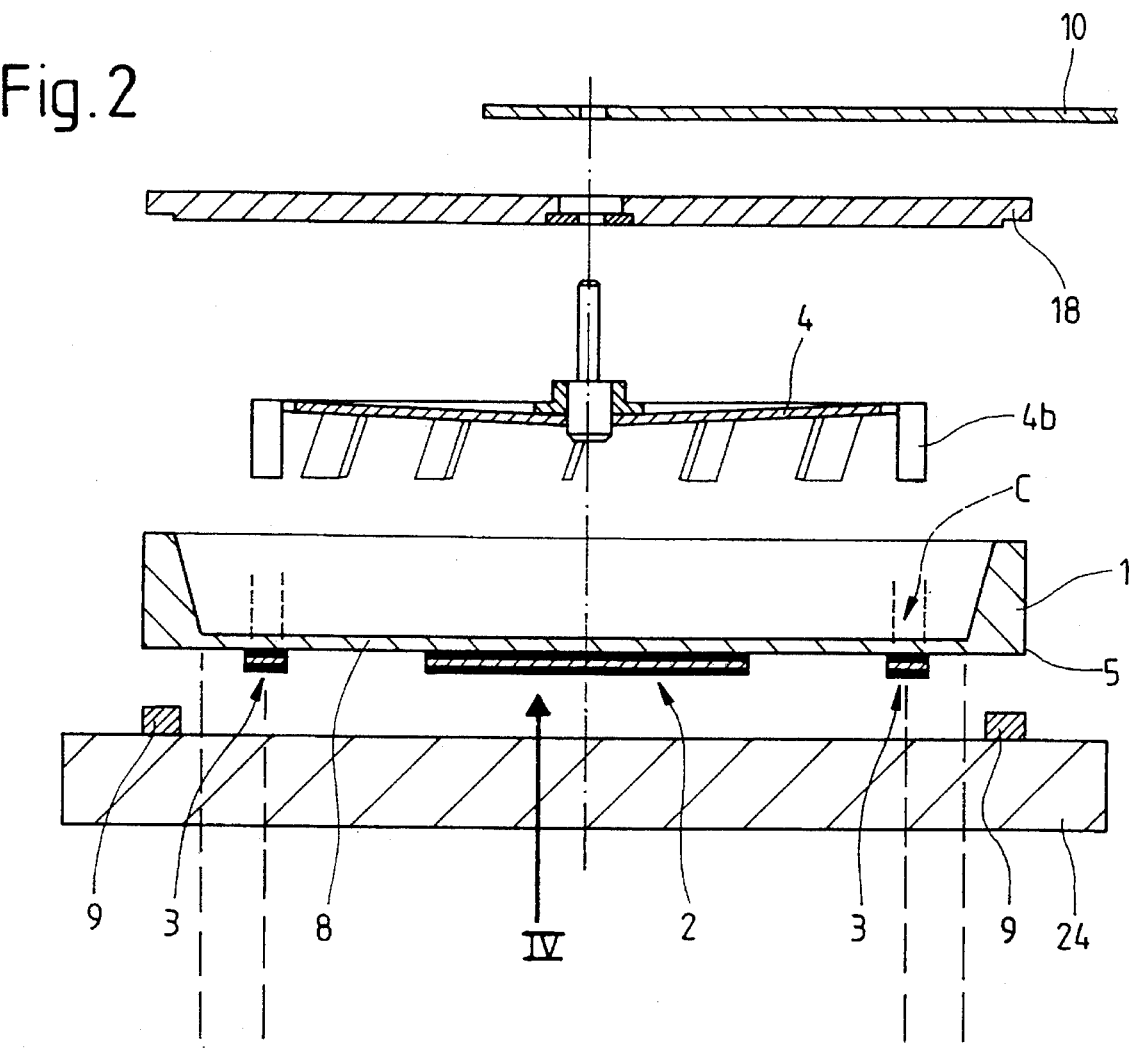
FIG. 2 is an exploded view of said motor, in which the piezo-electric active layers disposed under the stator are shown more clearly.

As is seen more specifically in FIGS. 1 and 2, rotor 4 rests axially in the bottom of cavity 6, which bottom has the form of a membrane 8 against which are fixed externally piezo-electric excitation means E and which forms the vibrating part V of stator 1.

Membrane 8 shows a very small thickness, between 0.01 mm and 0.02 mm.

The piezo-electric excitation means E which are formed in order to induce a vibratory motion of stator 1 and more specifically of membrane 8 are formed by deposition of thin layers including two electrically conducting, in particular metallic, layers E1 and E3 obtained from aluminium and forming electrodes, and a layer E2 of a piezo-electric material which is interposed between the other two layers; these layers being cut by a machining technique called surface-machining. The operation of such piezo-electric means E is well known and will not be described here in greater detail.

It will be noted in FIG. 2 that the piezo-electric means E are arranged against membrane 8 on its exterior and that, thanks to the deposition in thin layers, such means constitute only a very small extra thickness on membrane 8, in the order of 0.005 mm.

Stator 1 here further includes a peripheral enclosure which has the form of a reinforcing crown referenced 12 which constitutes the mechanical skeleton of stator 1 around membrane 8.

As for cavity 6, it advantageously takes the form of a tapered basin which opens out and which is open towards the exterior in particular towards the top in the position of the motor shown in FIG. 1.

As it will be noted in this figure, rotor 4 is wholly contained within stator 1 in its thickness and more specifically in housing 6 so that the assembly stator 1-rotor 4 does not form any extra thickness on the motor and constitutes an integrated unit by imbrication of one element into the other.

More specifically, membrane 8 and the crown-formed periphery 12 of the stator form a single part since they are formed together from a common wafer and are obtained by chemical attack of the latter.

Rotor 4 is mounted for rotation relative to stator 1 through a driving shaft 14 on which is fixed, in this example, a minute hand referenced 10.

Figure 3:
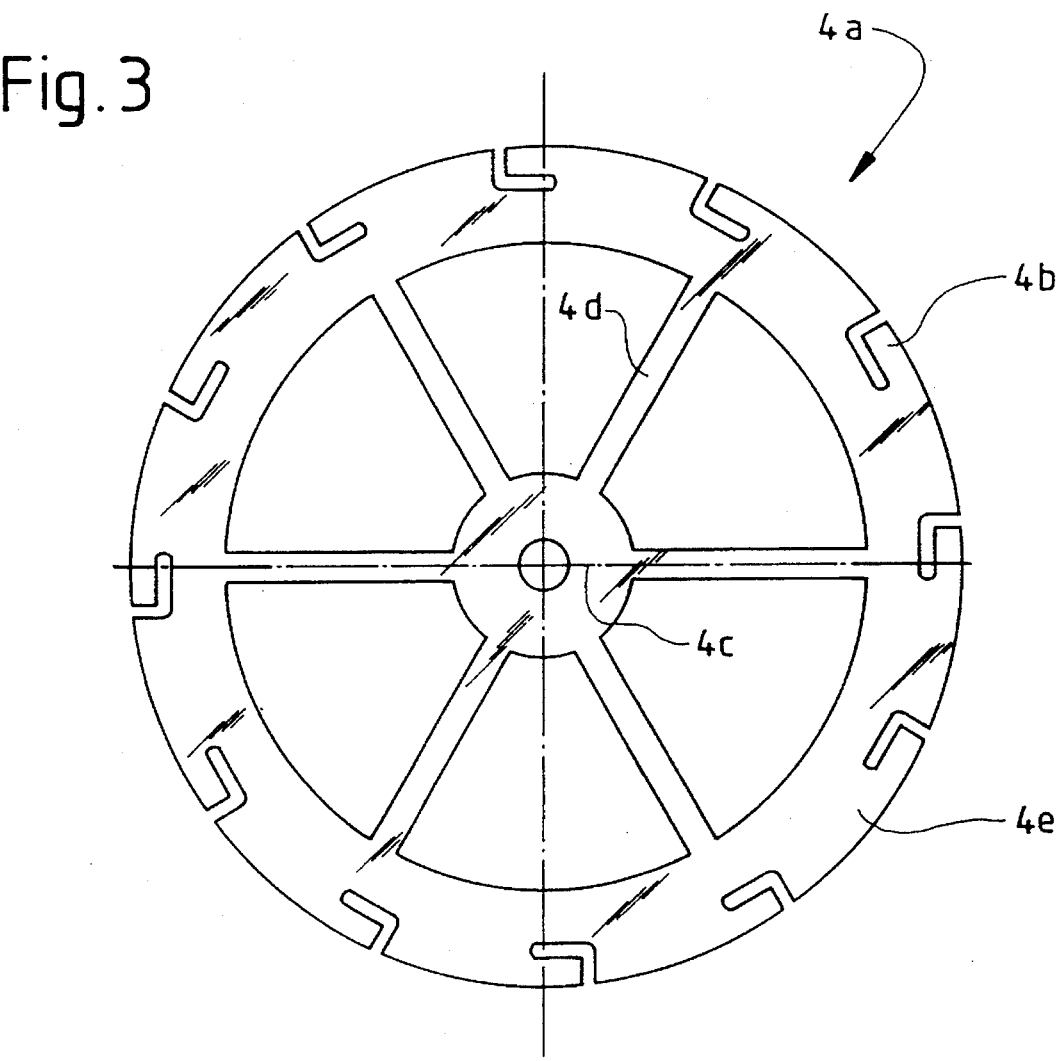
FIG. 3 is a top view of a flexible disc forming the rotor of the motor shown in FIGS. 1 and 2.

Rotor 4 includes a body which is in this example obtained in the form of a flexible perforated disc 4a (FIG. 3) including inclined tabs or flexible legs 4b ending up directly by a friction contact on the membrane 8 of stator 1. These tabs 4b transfer the vibratory motion of the stator to the rotor 4 and rotationally drive said rotor. These tabs are formed of an elastic material.

To this effect, rotor 4 and more specifically disc 4a includes a central hub 4c from which extend several radial elasticity arms 4d fixed to an annular ring 4e in which the tabs 4b are directly formed. A fixation ring 16 (FIG. 1) is fastened to the central hub 4c. Shaft 14 is mounted for rotation in a cover 18 by way of known guide means.

As was mentioned above the piezo-electric excitation means E are deposited and formed of thin layers under membrane 8, on the opposite side of the tub 6 by sets of appropriate masks (FIGS. 7A–7F and 8A–8F).

Furthermore, stator 1 is coupled and fastened fixedly to a printed circuit board 24 by several electrical conducting spacers 9, for example bumps, obtained by deposition of several tens of micrometers of conductive material on the circuit board, these spacers functioning as a mechanical support for the stator. The printed circuit board 24 includes electrical connection tracks (non represented) formed in a known manner by deposition of copper. These tracks are formed on the printed circuit board in order to come partially into respective coincidence with tracks or connection wires of the stator, referenced 11a, 11b, energising respectively the electrodes E1 and E3 of the piezo-electric excitation means E.

The electrical conductive tracks arranged on the stator are formed of aluminium and are deposited by way of thin layers under membrane 8 during the deposition of electrodes E1, E2 and E3 by appropriate sets of masks, non represented.

Stator 1 of the piezo-electric motor according to the invention is provided in addition to the piezo-electric excitation means E, with one or several piezo-electric sensors D so-called detection sensors, arranged for detecting the angular position of rotor 4.

Figure 2A:
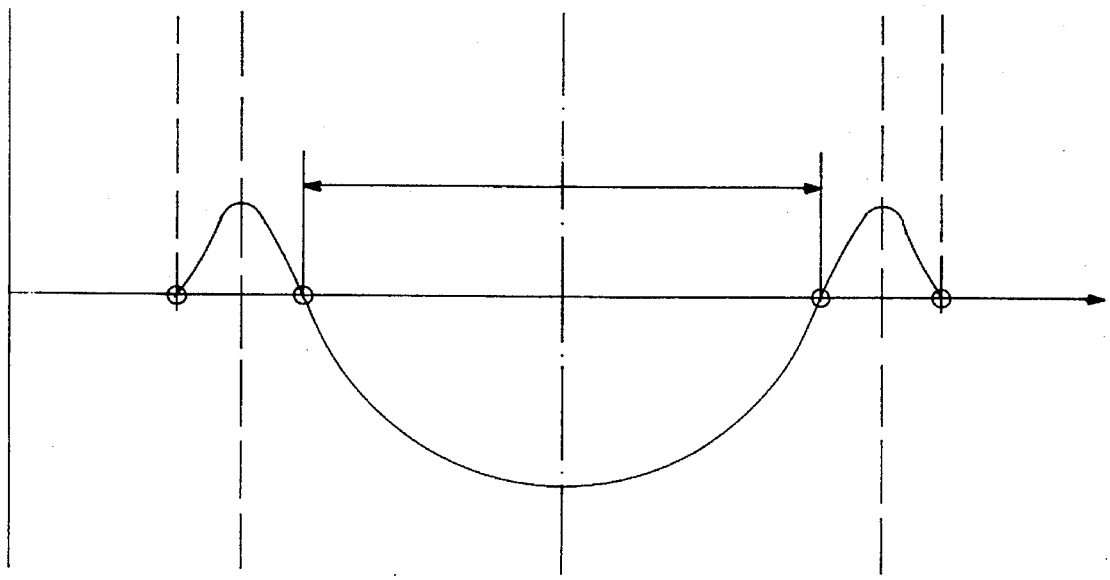
FIG. 2a represents schematically a vibration mode of the stator shown in FIG. 2.

FIG. 2a represents schematically a vibration mode of stator 1 of motor M according to the invention and as shown in FIG. 2. The maximum points of the vibration mode of stator 1, which correspond to the position of the detection sensor or sensors D, is conveniently placed so that they are close to and in line with the passage of flexion tabs 4b of rotor 4.

In this way, the tabs 4b will interact with membrane 8 and will thus distort lightly the vibration mode. This distortion can be detected so as to obtain an electric signal representative of the position of tabs 4b as will be explained more in detail hereafter.

Figure 5:
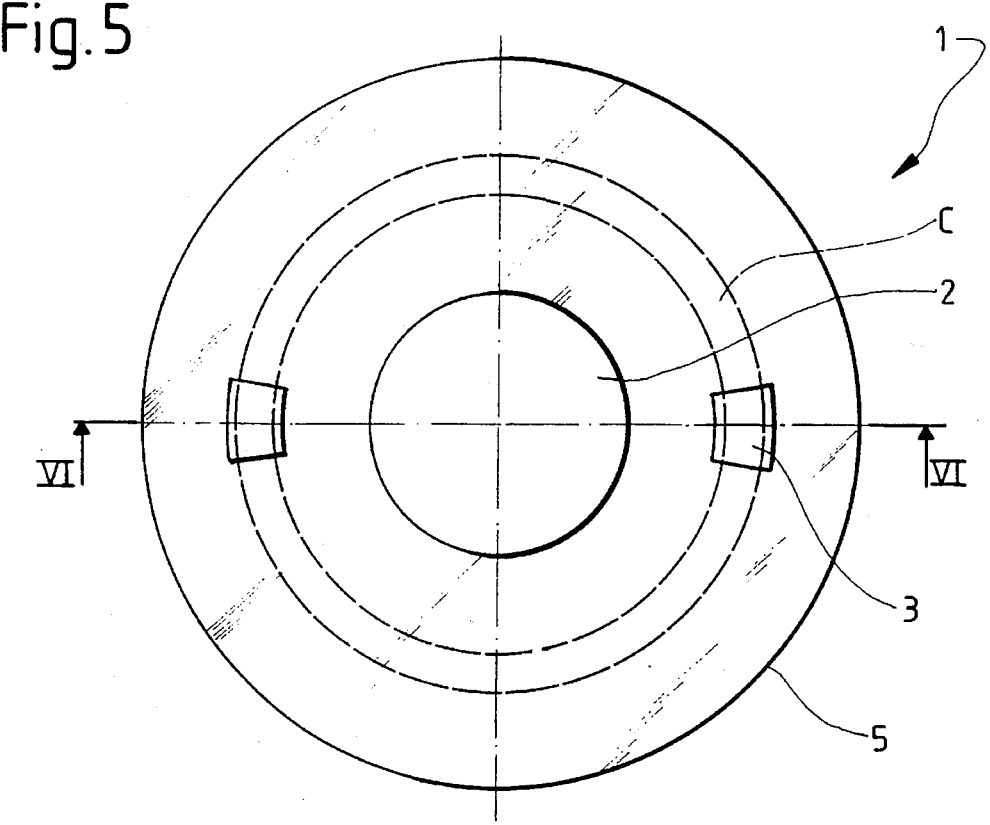
FIG. 5 is a view taken along the arrow IV of FIG. 2 and represents a bottom view of a stator according to a first embodiment of the motor according to the invention.

Referring more specifically to FIGS. 2 and 5, there will be described hereinafter a first embodiment of the position detector of the motor according to the invention.

As can be seen in these figures, not only the peizo-electric excitation means E are fastened externally onto stator 1, but the detection sensor or sensors D too, which are arranged by a classical machining process using phase vapour deposition (PVD) techniques. These piezo-electric detection means D also consist of a piezo-electric layer D2 interposed between the electrically conducting layers D1, D3 which are, for example metallic layers and which form the electrodes. These electrodes are connected by connection tracks or wires 13a, 13b to board 24 so they can be energised (FIG.

1). Piezo-electric means E define an excitation zone 2 having a circular form and positioned in the centre of the plate forming stator 1. By using the planar manufacturing technique, it is possible to manufacture simultaneously excitation zone 2 and one or several detection zones 3 (two detection zones being represented here), embodied by sensor or sensors D formed of the same piezo-electric material. In FIG. 5, it can be seen that the detection zone or zones 3 are positioned radially between excitation zone 2 and the radial edge 5 of stator 1. Each detection zone 3 is positioned preferably in line with and just under the passage of tabs 4b of rotor 4.

This arrangement thus constitutes a central circle formed of a piezo-electric active layer, i.e. excitation zone 2, surrounded by a non-active free zone which is itself surrounded by one or several piezo-electric active layers, i.e. detection zones 3.

Rotor 4 and more specifically its tabs 4b, rotationally driven by the stator, follow on membrane 8 a circular displacement path C which is concentric to excitation zone 2. In the shown example, each detection zone 3 is placed in line with the displacement path C. Tabs 4b of rotor 4 will solicit each detection zone 3 via membrane 8 during their passage, and through the reverse piezo-electric effect this zone will transmit, by means of non represented connection tracks, electric signals representative of the angular position of rotor 4.

Figure 4:
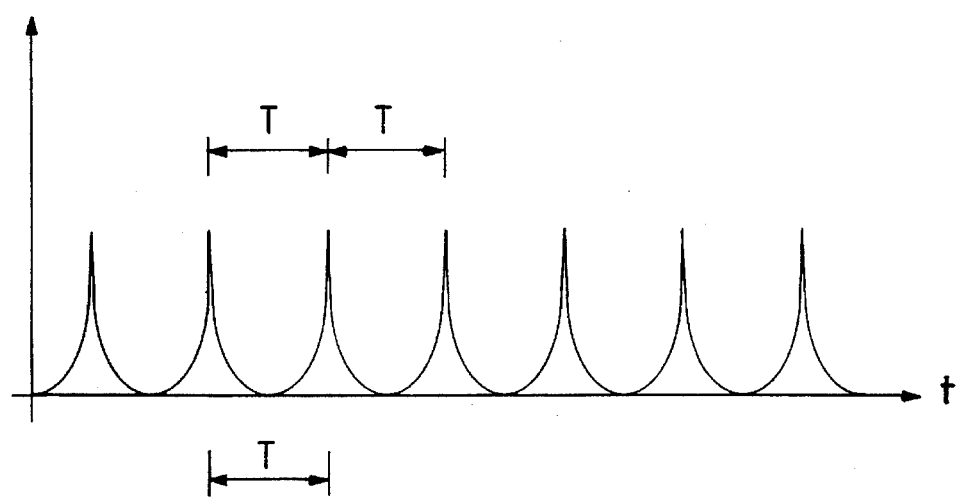
FIG. 4 represents schematically the distortion signal of the vibration mode representative of the position of the tabs of the rotor of the motor according to the invention.

FIG. 4 shows such an electric signal which is used to determine the position of tabs 4b. Each maximum or impulse is indicative of the distortion of the vibration mode of stator 1 at the moment that a tab 4b passes over detection zone 3, these maximums or impulses may be counted by an electronic digital device of a known configuration, non represented, so as to get to known the angular position of the rotor relative to stator 1, this being a function of the number of tabs 4b of rotor 4. The periodicity of the signal, which thus depends on the rotational speed of the rotor and on the number of tabs of the rotor as well as the distance between these tabs, is indicated by reference T.

Each detection zone 3 forming a detector D can locally measure the deformations of membrane 8 and the distortions of the vibration mode (see FIG. 2a) induced by the force exerted individually by each tab 4b of the rotor during its passing on or near one of the detectors D.

Figure 6:
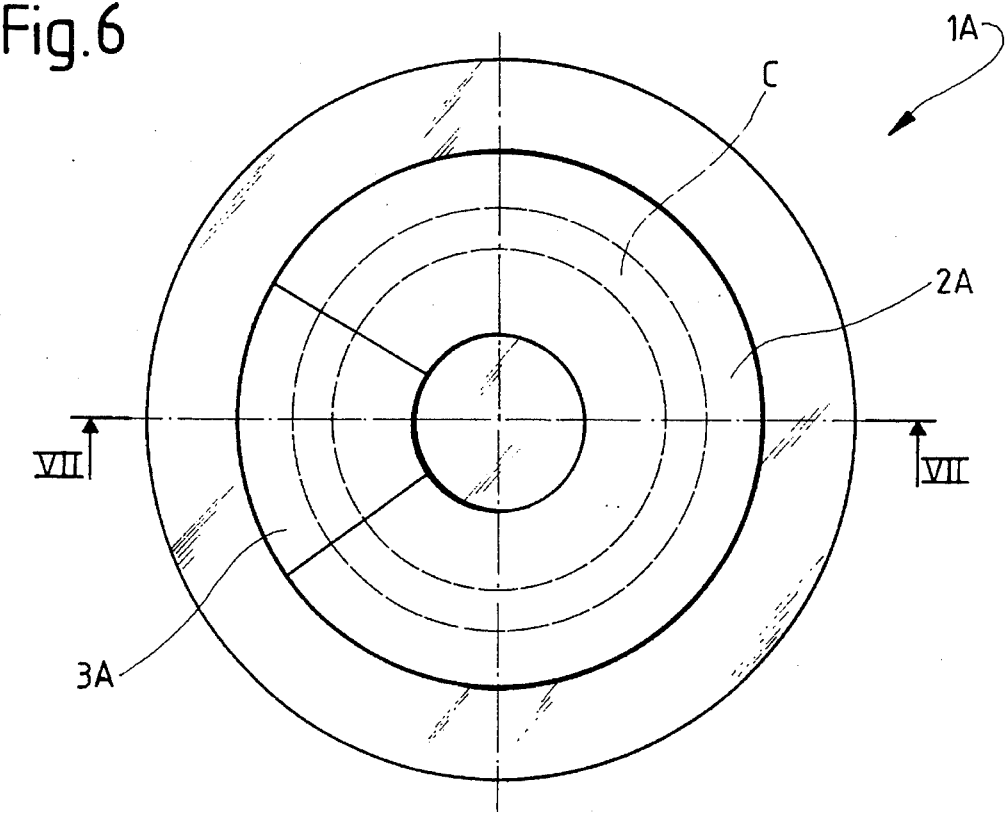
FIG. 6 is a view similar to that of FIG. 5, but representing a stator according to a second embodiment of the motor according to the invention.

Referring to FIG. 6, there will now be described a second embodiment of the piezo-electric motor according to the invention.

Here, stator 1A also consists of a plate, for example a silicon plate having the form of a membrane and is manufactured in the same way as the stator according to the first embodiment.

However, excitation zone 2A is not anymore centrally placed, but is preferably positioned below the passage way of tabs 4b of rotor 4. The form of excitation zone 2A is partially annular. In fact, this zone does not constitute a complete ring, a section of the latter forming the detection zone 3A. Thus, the detection zone is integrated in the ring of the excitation zone and forms with this zone a complete ring. The functioning of this detector is identical to that of the detector described above. Hence, a ring of a piezo-electric layer is obtained, a part of which being the principal part and acting as excitation zone 2A, while the other smaller part which is a section of the piezo-electric ring, acts as a detection zone 3A. It will be specified that the two zones 2A and 3A are electrically insulated.

Figure 7A:
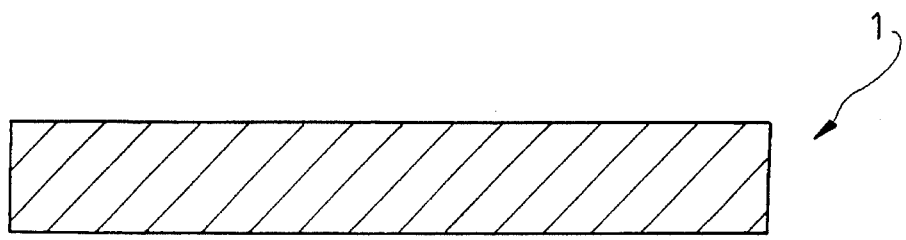
FIGS. 7A to 7F are schematic views representing a manufacturing process of a stator according to the first embodiment shown in FIG. 5, and FIGS. 8A to 8F are schematic views representing a manufacturing process of a stator according to the second embodiment shown in FIG. 6.
Figure 7B:
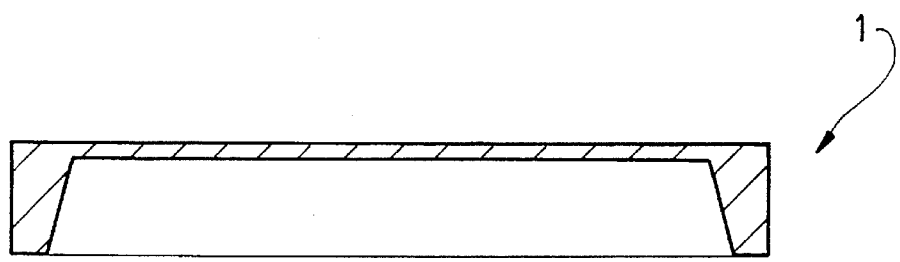
Figure 7C:
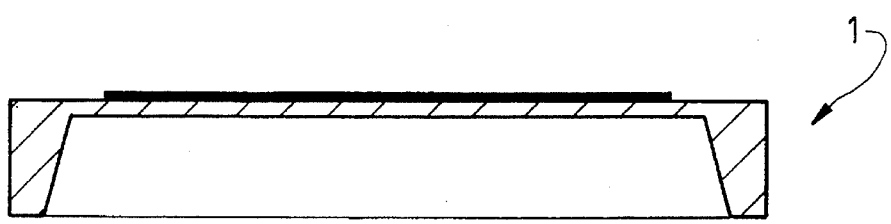
Figure 7D:
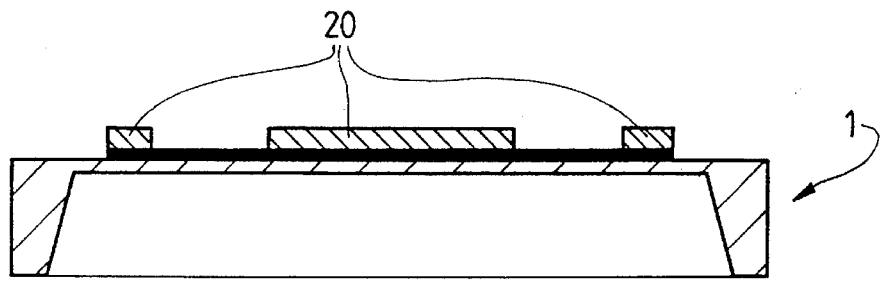
Figure 7E:
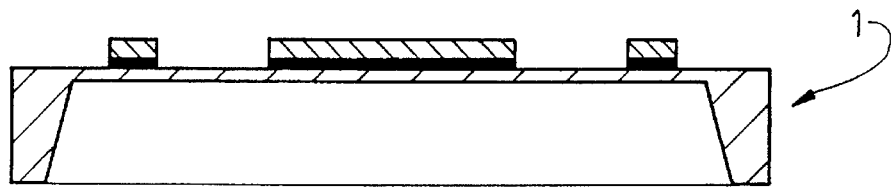
Figure 7F:
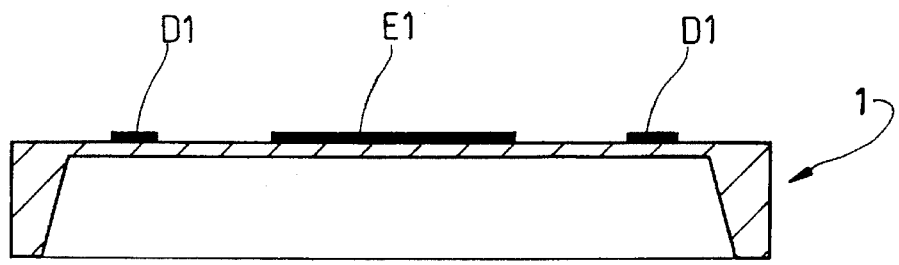

FIGS. 7A to 7F show schematically the steps of the manufacturing process of the stator according to the first embodiment. First of all (FIG. 7A), a disc, for example of silicon, is provided which will be used as a stator. This disc may be treated initially so as to obtain a stator, as can be seen in FIG. 7B, but it is also possible to form the stator after deposition of the peizo-electric layers (see FIG. 8F). Next, a conductive layer E1, D1 (FIG. 7C) which is structured by a photo-lithographical method and by chemical machining for example, is deposited by a set of appropriate masks. The disc is machined by micro machining its surface by chemically attacking it (FIG. 7E). First the protected part of the layer which is not protected by mask 20 is attacked and the mask is removed (FIG. 7F). Next, the piezo-electric layer E2, D2 (non-represented) is deposited which is treated in the same way followed by the second conductive layer E3, D3 which is also formed by photo-lithographical structuring and chemical machining. Thanks to an appropriate set of masks, in this way not only the excitation zone 2 is obtained, but at the same time detection zone 3 too. It will thus be understood, that each detector D which is of the same structure as excitation means E includes a thickness of the same order as that of the excitation means E, i.e. about 0.005 mm.

Figure 8A:
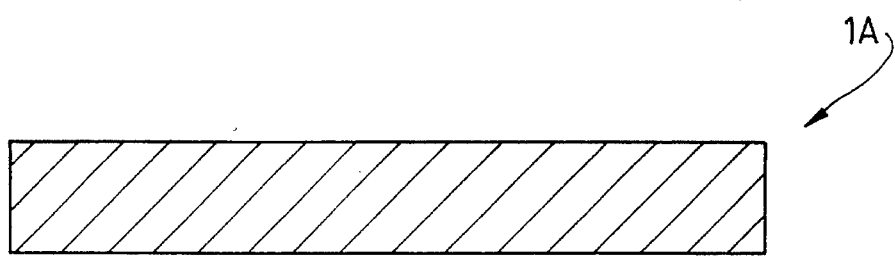
Figure 8B:
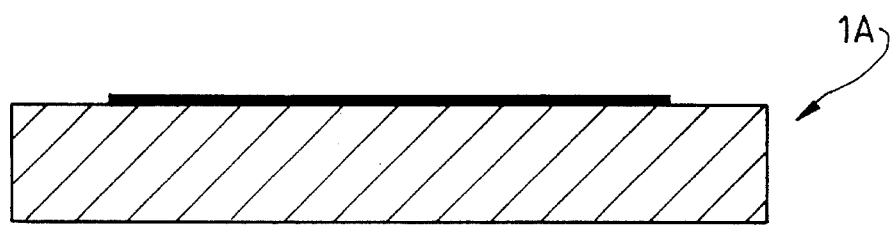
Figure 8C:
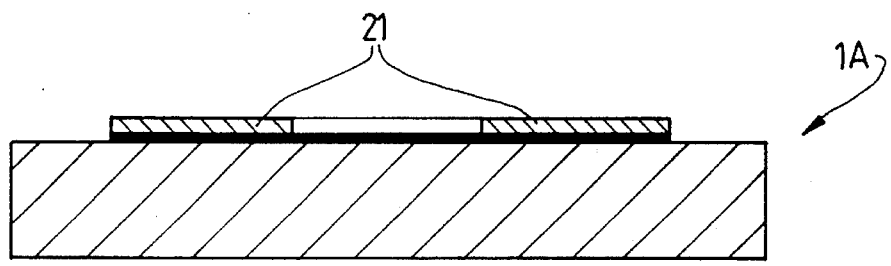
Figure 8D:
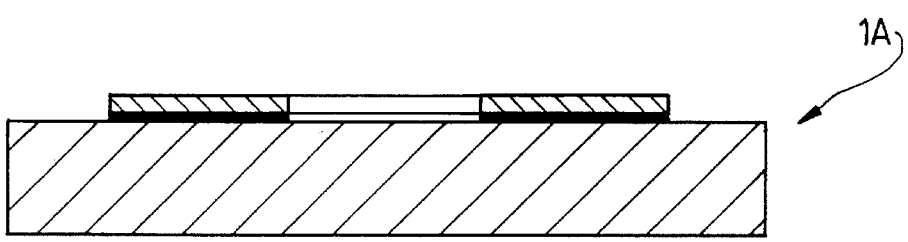
Figure 8E:
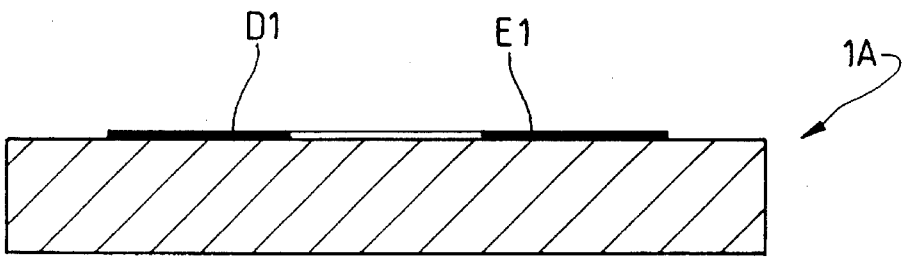
Figure 8F:
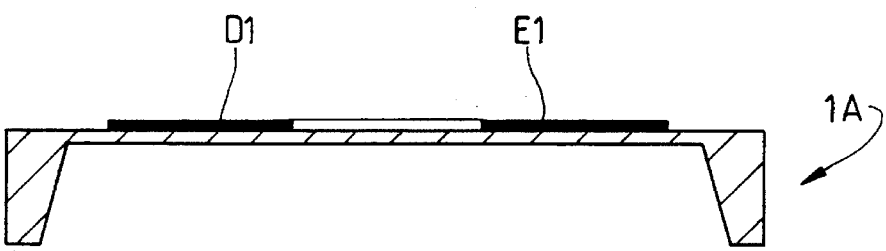

FIGS. 8A to 8F show similar steps of the manufacturing process of stator 1A according to the second embodiment where an appropriate mask 21 is used to obtain the excitation zone 2A and detection zone 3A is the same ring of piezo-electric material. Here, the layers and appropriate masks have been deposited on the disc initially, followed by the forming of the membrane by chemical machining (FIG. 8F).

Hence, it will be understood from what has been described here before, that it is possible to integrate directly in the manufacturing process of the excitation zone, the manufacturing of one or several detection zones forming at least one detector which can detect the angular position of the rotor and which thus advantageously replaces an external encoder. Finally, a very compact assembly is obtained which is easy to manufacture, the manufacturing of the piezo-electric motor provided with the detector being obtained by a simple modification of the set of masks used to obtain the excitation zone. Hence, important savings may be obtained by reducing the number of parts, thereby simplifying the construction and the assembly of the piezo-electric motor provided with the angular position detector of the rotor as is described above.

What we claim is:

1. Piezo-electric motor of the stationary wave type comprising:

a stator including piezo-electric excitation means capable of inducing a vibratory motion in the stator, a rotor mounted for rotation relative to the stator, said rotor including a body on which are assembled, in a regular pattern, a plurality of flexion tabs forming transmission means arranged to transmit the vibratory motion of the stator to said rotor and to rotationally drive such rotor, said flexion tabs following a displacement path relative to the stator, and further comprising:

an angular position detector for detecting the angular position of the rotor, said detector being arranged near and in line with said displacement path, said detector comprising at least one piezo-electric sensor for tracking the passage of said tabs by measuring deformations of the stator induced by a force exerted individually by each tab of the rotor during its passage on or near the detector so as to produce an electric signal having a periodicity depending on the rotational speed of the rotor and on the number of tabs as well as the distance between the tabs, said electric signal being representative of the position of the tabs and thus of the angular position of the rotor.

2. Motor according to claim 1, wherein said detector is fixedly attached to said stator.

3. Motor according to claim 1, wherein said detector is deposited onto the stator.

4. Motor according to claim 1, wherein said stator comprises an elastic material such as silicon and is in the form of a membrane against which are fastened externally peizo-electric active layers constituting said piezo-electric excitation means and said detector.

5. Motor according to claim 4, wherein said peizo-electric excitation means are of a circular form and are arranged at the center of the stator, and said detector is arranged radially between said excitation means and a radial edge of the stator.

6. Motor according to claim 4, wherein said detector and said piezo-electric excitation means together form a ring which is positioned near, and in line with, the displacement path of said tabs of the rotor, one or several sections of the ring constituting said detector and the rest of the ring constituting said excitation means.

* * * * *